United States Patent [19]

Honda et al.

[11] Patent Number: 5,432,565
[45] Date of Patent: Jul. 11, 1995

[54] Y/C SEPARATION CIRCUIT FOR VIDEO USE HAVING SEPARATING MEANS FOR SEPARATING THE CHROMINANCE SIGNAL AND THE LUMINANCE SIGNAL ON THE BASIS OF INPUT AND OUTPUT SIGNALS

[75] Inventors: Fumiaki Honda, Takatsuki; Nobukazu Hosoya, Naka, both of Japan

[73] Assignee: Sanyo Electric Co., Ltd., Osaka, Japan

[21] Appl. No.: 216,589

[22] Filed: Mar. 23, 1994

[30] Foreign Application Priority Data

Mar. 23, 1993 [JP] Japan .................................. 5-064015
Apr. 22, 1993 [JP] Japan .................................. 5-096059

[51] Int. Cl.⁶ .............................................. H04N 9/78
[52] U.S. Cl. ............................... 348/665; 348/505
[58] Field of Search ............... 348/234, 663, 665, 666, 348/654, 645, 505, 506, 507; H04N 9/78

[56] References Cited

U.S. PATENT DOCUMENTS 3,679,816  7/1972  Avins et al. ........................... 348/507
5,132,784  7/1992  Hague et al. .......................... 348/665
5,267,027  11/1993  Ugaki et al. .
5,353,066  10/1994  Lee ........................................ 348/663

FOREIGN PATENT DOCUMENTS 0511682  11/1992  European Pat. Off. ........ H04N 9/78
0082187  4/1988  Japan .............................. H04N 9/78

*Primary Examiner*—James J. Groody
*Assistant Examiner*—Jeffrey S. Murrell
*Attorney, Agent, or Firm*—Armstrong, Westerman, Hattori, McLeland & Naughton

[57] ABSTRACT

A Y/C separation circuit includes a first adder by which a carrier-multiplexed composite video signal is produced by multiplexing a color sub-carrier signal which is in synchronization with a color burst signal on a composite video signal during a vertical blanking period. The carrier-multiplexed composite video signal inputted to a 1H delay line and outputted from the 1H delay line. The carrier-multiplexed composite video signals at the input and the output of the 1H delay line are inputted to a second adder, and a subtracter, respectively. A luminance signal component and a chrominance signal component are respectively outputted from the second adder and the subtracter.

12 Claims, 5 Drawing Sheets

Y/C SEPARATION CIRCUIT FOR VIDEO USE HAVING SEPARATING MEANS FOR SEPARATING THE CHROMINANCE SIGNAL AND THE LUMINANCE SIGNAL ON THE BASIS OF INPUT AND OUTPUT SIGNALS

BACKGROUND OF THE INVENTION

1. Field of the Invention

The present invention relates to a Y/C separation circuit. More specifically, the present invention relates to a Y/C separation circuit which is utilized in a video signal processing apparatus such as a television receiver and in which a luminance signal (Y signal) and a chrominance signal (C signal) are separated from a composite video signal by utilizing a 1H (horizontal scanning period) delay line.

2. Description of the Prior Art

In the past, as a 1H delay line for such a Y/C separation circuit, in general, a glass delay line or a CCD delay line was utilized; however, an insertion loss of such a kind of delay line is not constant, each having variation of the insertion loss. On the other hand, as an important item for a performance of the Y/C separation circuit, there is a separation degree of the luminance signal and the chrominance signal, that is, a depth of a comb characteristic.

Therefore, in a prior art, as shown in FIG. 1, in order to make amplitudes of the C signal component of the composite video signal passed through a 1H delay line 1 and the C signal component of the composite video signal not passed through the 1H delay line 1 be coincident to each other, in a manufacturing step of the video signal processing apparatus such as a television receiver, video tape recorder and etc., it is necessary to adjust a gain of a gain-variable amplifier 2. That is, in FIG. 1 prior art, the variation of an amplitude due to the variation of the insertion loss of the 1H delay line 1 is corrected by adjusting the gain of the gain-variable amplifier 2, and the composite video signal passed through the 1H delay line 1 and the composite video signal not passed through the 1H delay line 1 are inputted to an adder 3 and a subtracter 4, respectively, and the luminance signal and the chrominance signal are withdrawn from the adder 3 and the subtracter 4, respectively. Thus, in FIG. 1 prior art, it was necessary to adjust in advance the gain of the gain-variable amplifier 2.

Then, the same assignee as that of the present invention has proposed a technique for solving such a disadvantage of FIG. 1 prior art in an embodiment shown in U.S. Pat. No. 5,267,027 issued on Nov. 30, 1993. In this proposed prior art, as shown in FIG. 2, in order to make an operation of the Y/C separation circuit be stable at a point that a color burst signal included in the luminance signal outputted from the Y/C separation circuit becomes to be minimized, a color burst signal included in the composite video signal not passed through the 1H delay line 1 (or the composite video signal passed through the 1H delay line 1) and the color burst signal included in the luminance signal are multiplied by a multiplier 5, and a voltage-controlled gain-variable amplifier 6 is controlled by an output signal from the multiplier 5, whereby the amplitude can be automatically adjusted.

Thus, in FIG. 2 prior art, by detecting the amplitude of the color burst signal, the insertion loss amount of the 1H delay line or the like is automatically corrected, and therefore, in a case where a signal including a large number of noises and having a small burst signal level such as a signal at a time of a weak electric field, a signal obtained by reproducing the video tape recorder, and etc., it is difficult to surely detect the amplitude of the color burst signal. That is, in FIG. 2 prior art, there occurs a problem that the Y/C separation degree is dependent on the level of the input signal, S/N ratio and etc.

Furthermore, one example of a conventional Y/C separation circuit in which a 1H glass delay line is utilized is shown in FIG. 3. The Y/C separation circuit shown in FIG. 3 separates the luminance signal and the chrominance signal by utilizing a fact that a phase of the chrominance signal is inverted at every two lines. Therefore, in FIG. 3 prior art, a delay time of the 1H glass delay line 1' must be surely 1H (horizontal scanning period). However, in general, in the 1H glass delay line 1', a pair of supersonic transducers are provided on the opposite angles of a rectangular glass substrate, and an electric signal which is inputted to one supersonic transducer is withdrawn from the other supersonic transducer as an electric signal with 1H delay according to a surface form of the glass substrate between the transducers, and therefore, the variation occurs in delay time due to the irregularity of the working of the glass substrate.

Then, as shown in FIG. 3, the 1H glass delay line 1' is terminated by utilizing a variable inductance coil L, and by adjusting an inductance value of the variable inductance coil L, the variation of the delay time of the 1H glass delay line 1' is corrected.

However, in the prior art Y/C separation circuit shown in FIG. 3, since the variable inductance coil L is adjusted by a human work, and therefore, not only it takes a long time for adjusting the inductance value but also the variation in performance occurs for each product.

Then, the same assignee as that of the present invention has proposed a technique in which the 1H glass delay line 1 is constructed by utilizing a semiconductor variable inductance circuit (hereinafter, called as "gylator") which terminates at least one of an input end and an output end of the 1H glass delay line 1', instead of the variable inductance coil L, in an embodiment of the above described U.S. Pat. No. 5,267,027. Then, signals at the input end and the output end of the 1H glass delay line 1' are multiplied, and by controlling the gylator by a multiplication output, the variation of the delay time of the 1H glass delay line 1' can be automatically adjusted.

In addition, in an output signal from the 1H glass delay line, in general, a spurious component which is delayed by more than one horizontal scanning period exists other than a signal component which is delayed by one horizontal scanning period. Therefore, a spurious component occurs by passing the chrominance signal which exists in an effective video signal period through the 1H glass delay line, and the spurious component is added to the color burst signal, and therefore, a phase condition of the color burst signal is changed.

This will be described with referring to FIG. 4. FIG. 4 shows an input chrominance signal and an output chrominance signal to or from the 1H glass delay line, wherein FIG. 4(A) shows the input chrominance signal to the 1H glass delay line, and FIG. 4(B) shows the output chrominance signal from the 1H glass delay line.

In FIG. 4, in a case where a signal (C1 or C3) having a low color saturation degree of a video signal is inputted to the 1H glass delay line 1', although a spurious component of the signal C1 or C3 is superposed on the color burst signal B2 or B4 as shown in FIG. 5(B), a level of the spurious component of the signal C1 or C3 is sufficiently lower than a level of the signal B2 or B4, and therefore, the influence due to the spurious component to the color burst signal B2 or B4 is small.

On the other hand, in a case where a signal C2 having a high color saturation degree of the video signal is inputted to the 1H glass delay line 1', a spurious component of the signal C2 is superposed on the color burst signal B3. At this time, a level of the spurious component due to the signal C2 is high, and the influence due to the spurious component to the signal B3 becomes large, and therefore, a phase of the signal B3 is changed. Accordingly, if the gylator is controlled by a signal obtained on the basis of the signal B3, a delay amount of the 1H glass delay line 1' becomes different from that of a normal state, and therefore, the Y/C separation degree becomes bad.

In addition, in the above, the influence due to the spurious component by the chrominance signal to the Y/C separation degree is described; however, a spurious component due to a luminance signal also affects the Y/C separation degree.

In addition, it is difficult to surely control the phase relationship of the color burst signal at a time of a signal including a large number noises such as a signal at a weak electric field, a signal obtained by reproducing the video tape recorder, and etc.

SUMMARY OF THE INVENTION

Therefore, a principal object of the present invention is to provide a novel Y/C separation circuit.

Another object of the present invention is to provide a Y/C separation circuit with simple structure and with high accuracy.

In a Y/C separation circuit in accordance with the present invention, a carrier-multiplexed composite video signal is produced by multiplexing a color sub-carrier signal which is in synchronization with a color burst signal on a composite video signal during a vertical blanking period by first adding means. A luminance signal and a chrominance signal are separated from the carrier-multiplexed composite video signal by utilizing a 1H delay line.

In an embodiment, a color burst signal of a carrier-multiplexed composite video signal outputted from the first adding means (or a carrier-multiplexed composite video signal passed through the 1H delay line) and a color burst signal included in the luminance signal output from second adding means are multiplied during the vertical blanking period, and a gain-variable amplifier is controlled by an output signal from a multiplier.

Furthermore, in another embodiment utilizing a 1H glass delay line, an inductance value of a gylator can be automatically controlled such that a phase difference between the color sub-carrier signal of the carrier-multiplexed composite video signal passed through the 1H delay line and the color sub-carrier signal included in the carrier-multiplexed composite video signal not passed through the 1H glass delay line becomes 180 degrees.

In accordance with the present invention, it is possible to obtain a Y/C separation circuit with high accuracy in respect to a video signal including a large number of noises as such a signal at a weak electric field, a signal obtained by reproducing a video tape recorder, and etc., and it is possible to obtain a stable operation of a Y/C separation circuit, which is not affected by a signal level of an inputted composite video signal.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
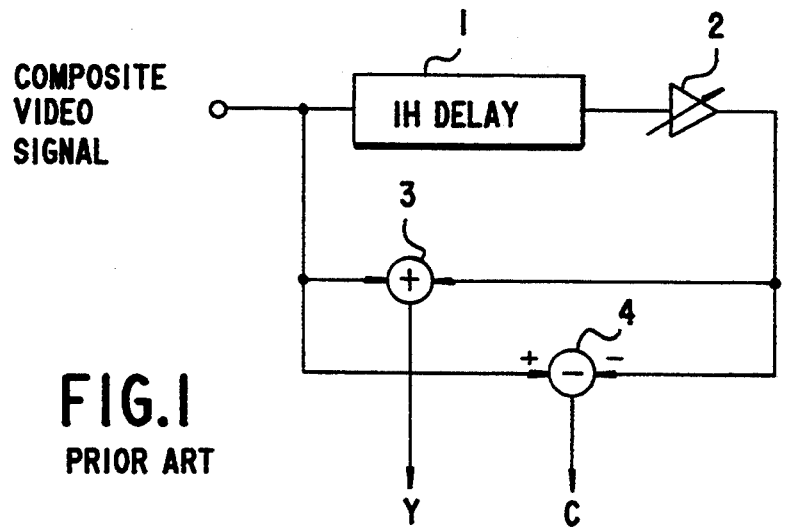
FIG. 1 is a block diagram showing one example of a conventional Y/C separation circuit.
Figure 2:
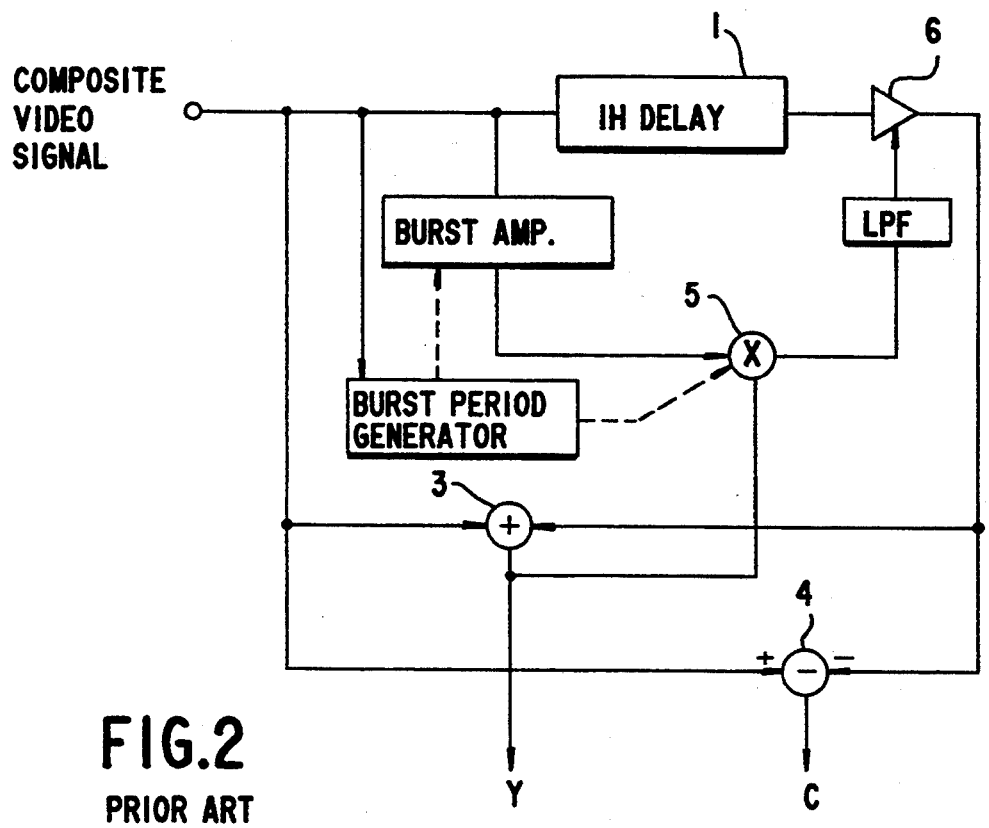
FIG. 2 is a block diagram showing a proposed Y/C separation circuit.
Figure 3:
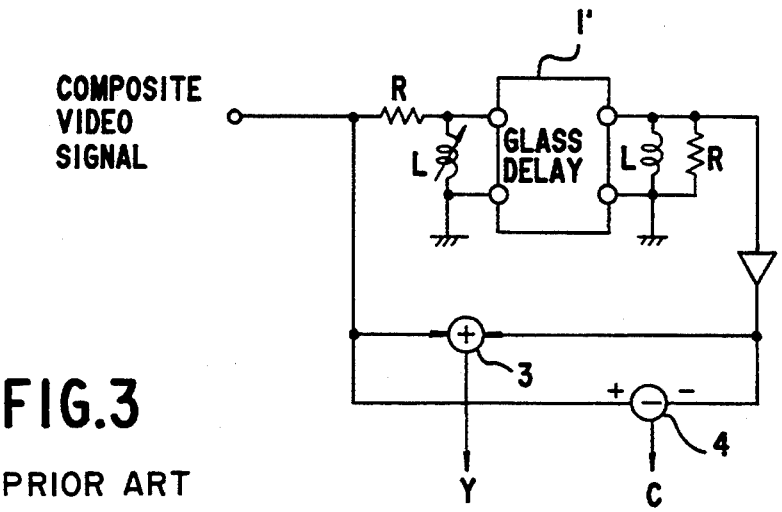
FIG. 3 is a block diagram showing another example of the conventional Y/C separation circuit.
Figure 4:
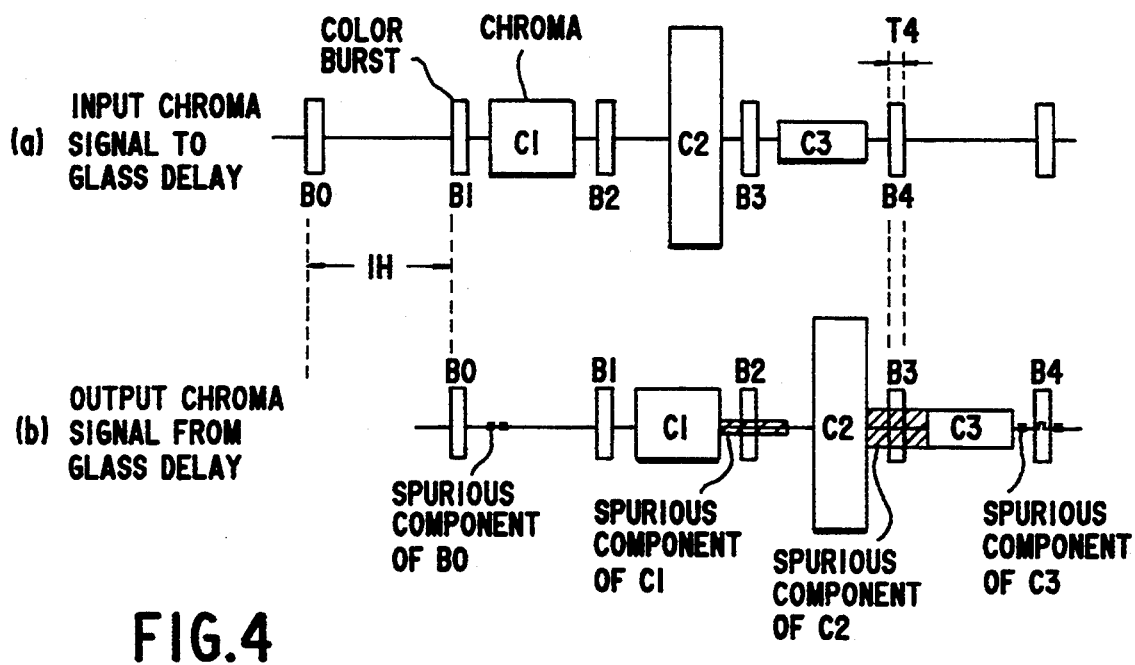
FIG. 4 is an illustrative view showing an input chrominance signal and an output chrominance signal to or from a 1H glass delay line in FIG. 3 circuit.
Figure 5:
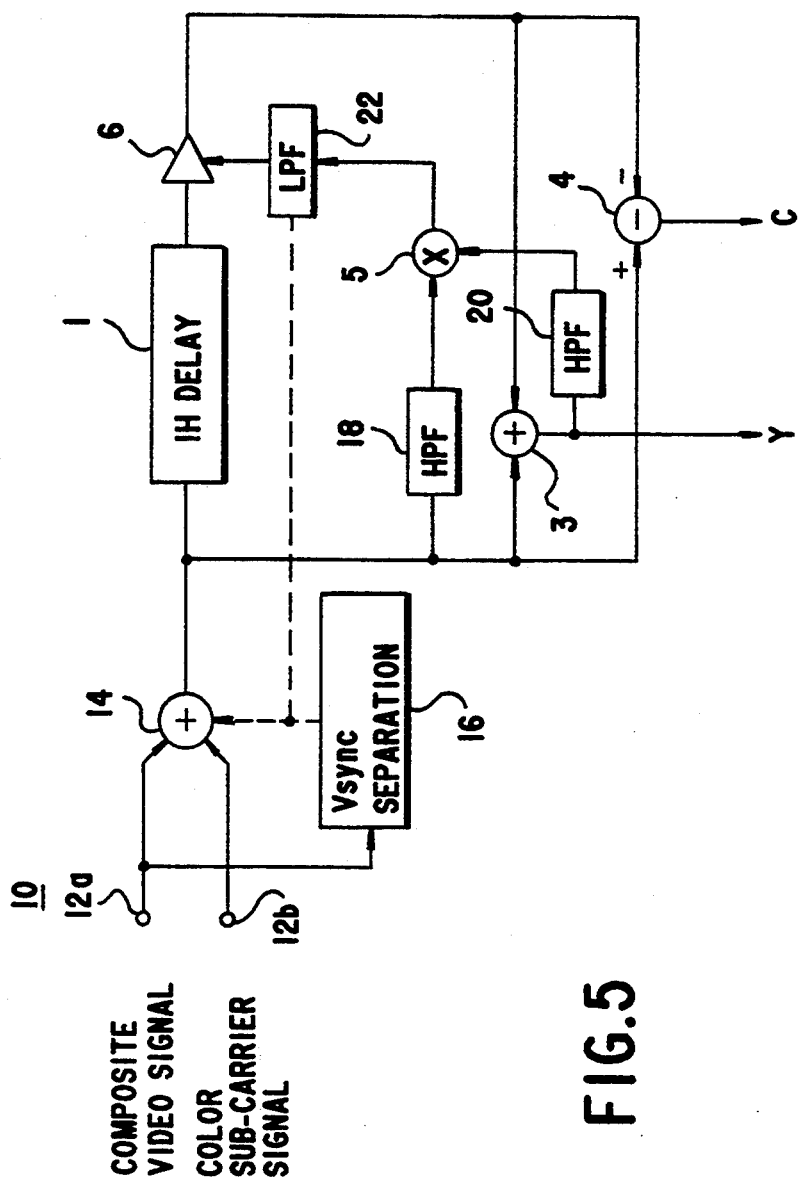
FIG. 5 is a block diagram showing one embodiment according to the present invention.

A Y/C separation circuit 10 of an embodiment shown in FIG. 5 includes an input terminal 12a to which a composite video signal is inputted and an input terminal 12b to which a color sub-carrier signal is inputted. The video composite signal is composed of a first signal including a color burst signal and a chrominance signal, and a second signal including a luminance signal which has the frequency-interleave relationship to the first signal. The composite video signal and the color sub-carrier signal respectively inputted to the input terminals 12a and 12b are applied to a first adder 14. In addition, as well known, the color sub-carrier signal can be produced by a reference oscillator (not shown) or the like, for example, in synchronization with a color burst signal included in the composite video signal. An operation of the first adder 14 is controlled by a vertical synchronization signal outputted from a vertical synchronization signal separation circuit 16, and therefore, during a vertical blanking period, the composite video signal and the color sub-carrier signal are added to each other to be outputted from the first adder 14, and a period other than the vertical blanking period, the composite video signal is outputted from the first adder 14 as it is. That is, an output from the first adder 14 becomes a multiplexed signal in which the color sub-carrier signal from the reference oscillator is superposed on the composite video signal only for the vertical blanking period (hereinafter, the output signal from the first adder 14 is called as "carrier-multiplexed composite video signal").

The carrier-multiplexed composite video signal is applied to respective one inputs of a second adder 3 and a subtracter 4, and inputted to a 1H delay line 1 and a first high-pass filter 18, respectively. Therefore, the carrier-multiplexed composite video signal is delayed by 1 horizontal period (1H) by the 1H delay line 1.

Thereafter, an amplitude of the carrier-multiplexed composite video signal is further adjusted by a voltage-controlled gain-variable amplifier 6. The carrier-multiplexed composite video signal through the voltage-controlled gain-variable amplifier 6 is applied to respective other inputs of the second adder 3 and the subtracter 4. Then, a luminance signal and a chrominance signal are outputted from the second adder 3 and the subtracter 4, respectively.

Meanwhile, as described above, the carrier-multiplexed composite video signal is further applied to the first high-pass filter 18. Therefore, a carrier signal component is derived from the carrier-multiplexed composite video signal by the first high-pass filter 18, and the carrier signal component is applied to one input of a multiplier 5. To the other input of the multiplier 5, a carrier signal component which is derived from an output signal of the second adder 3, i.e. the luminance signal by a second high-pass filter 20. That is, a residual carrier signal component included in the luminance signal which is the output of the second adder 3 is derived by the second high-pass filter 20, and the same is applied to the multiplier 5 which operates as phase-comparing means.

More specifically, the multiplier 5 is such constructed that the multiplier 5 outputs a positive signal when the two inputs are in-phase, and a negative signal when the two inputs are anti-phase. Then, an output signal from the multiplier 5 is applied to the voltage-controlled gain-variable amplifier 6 via a low-pass filter 22 which operates only for the vertical blanking period. A gain of the voltage-controlled gain-variable amplifier 6 is changed in accordance with a control voltage which is applied from the low-pass filter 22. The larger control voltage, the larger gain, and the smaller control voltage, the smaller gain. Thus, the gain of the voltage-controlled gain-variable amplifier 6 is controlled in accordance with a phase relationship of two signals inputted to the multiplier 5, so that the residual carrier signal component included in the luminance signal output becomes to be minimized.

In addition, details of the multiplier 5, the low-pass filter 22, and etc. are disclosed in the previously recited U.S. Pat. No. 5,267,027, and the components each having circuit structure the same or similar to the circuit structure disclosed therein can be utilized in this embodiment shown, and therefore, the detailed description of the components is omitted here, and incorporated in the specification by quoting U.S. Pat. No. 5,267,027.

In the Y/C separation circuit 10 of this embodiment shown, when levels of the two signals inputted to the second adder 3 are equal to each other, since a phase difference of the carrier signals inputted to the second adder 3 is 180 degrees, no residual carrier signal component can be detected in the luminance signal outputted from the second adder 3. Therefore, a detection output from the multiplier 5 becomes zero, and the gain of the voltage-controlled gain-variable amplifier 6 is not changed, and therefore, the circuit 10 becomes a stable state.

Next, in a case where a level of the carrier-multiplexed composite video signal from the voltage-controlled gain-variable amplifier 6 is larger than a level of the carrier-multiplexed composite video signal from the first adder 14, a residual carrier signal component due to the voltage-controlled gain-variable amplifier 6 appears in the luminance signal from the second adder 3. Then, a phase of the carrier signal component becomes to be anti-phase with respect to the carrier signal of the output of the first adder 14 (or in-phase with respect to the carrier signal of the output of the voltage-controlled gain-variable amplifier 6), and therefore, phases of the carrier signals respectively inputted to the multiplier 5 becomes to be anti-phase. Accordingly, the output from the multiplier 5 becomes negative, and therefore, the control voltage from the low-pass filter 22 is lowered, and the gain of the voltage-controlled gain-variable amplifier 6 is made small. Then, the gain of the voltage-controlled gain variable amplifier 6 is controlled such that the carrier signal levels of the two signals inputted to the second adder 3 become equal to each other finally.

Furthermore, in a case where an output level from the voltage-controlled gain-variable amplifier 6 is smaller than an output level from the first adder 14, a residual carrier signal component due to the first adder 14 appears in the luminance signal from the second adder 3. Then, a phase of the residual carrier signal component becomes to be in-phase with respect to the carrier signal of the output of the first adder 14 (or anti-phase with respect to the carrier signal of the output of the voltage-controlled gain-variable amplifier 6), and therefore, phases of the carrier signals respectively inputted to the multiplier 5 becomes to be in-phase. Therefore, the output from the multiplier 5 becomes positive, and therefore, the control voltage from the low-pass filter 22 is increased, and the gain of the voltage-controlled gain-variable amplifier 6 is made large. Then, the gain of the voltage-controlled gain-variable amplifier 6 is controlled such that the carrier signal levels of the signals inputted to the second adder 3 become equal to each other finally.

In addition, since the vertical synchronization signal is supplied to the low-pass filter 22, the low-pass filter operates only for the vertical blanking period, and therefore, it is possible to surely operate the voltage-controlled gain-variable amplifier 6.

Furthermore, in this embodiment shown, the carrier signal component included in the carrier-multiplexed composite video signal outputted from the first adder 14 and the residual carrier signal component included in the luminance signal from the second adder 3 are multiplied by the multiplier 5, and the voltage-controlled gain-variable amplifier 6 is controlled by the multiplication output; however, the carrier signal component included in the carrier-multiplexed composite video signal which is passed through the 1H delay line 1 and the residual carrier signal component included in the luminance signal from the second adder 3 may be multiplied, and the voltage-controlled gain-variable amplifier 6 may be controlled by such a multiplication output.

Figure 6:
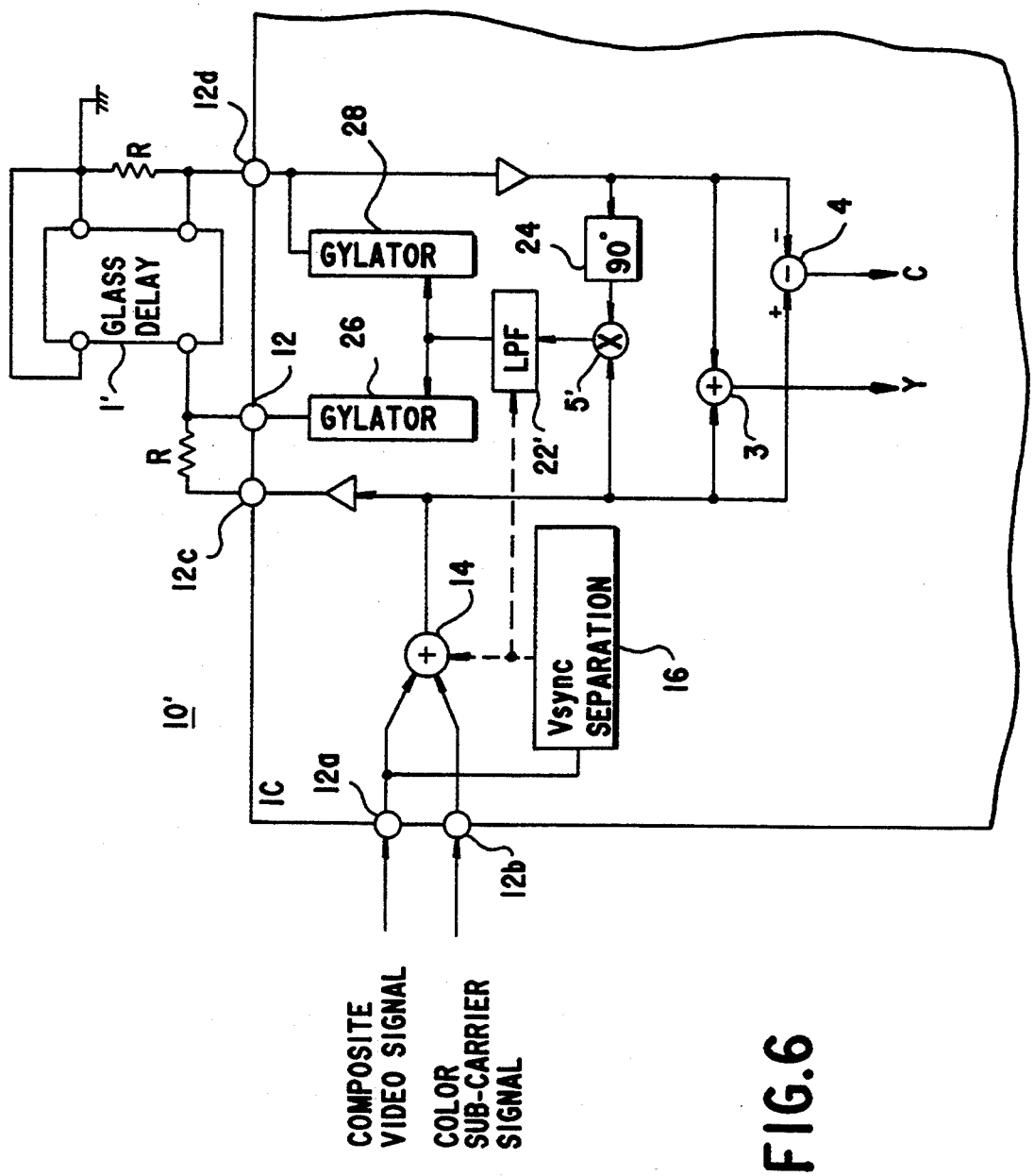
FIG. 6 is a block diagram showing another embodiment according to the present invention.

A Y/C separation circuit 10' shown in FIG. 6 of another embodiment according to the present invention includes the input terminals 12a and 12b of an integrated circuit which respectively receives the composite video signal and the color sub-carrier signal which is in synchronization with the color burst signal of the composite video signal, and generated by a reference oscillator or the like. The composite video signal and the color sub-carrier signal are inputted to the first adder 14. An operation of the first adder 14 is similar to the operation of the first adder 14 of FIG. 5 embodiment, and therefore, a duplicate description will be omitted here.

Then, the carrier-multiplexed composite video signal is applied to respective one inputs of the second adder 3 and the subtracter 4, and inputted to a 1H glass delay line 1' via an output terminal 12c of the integrated circuit. Then, the carrier-multiplexed composite video signal is delayed by one horizontal period (1H) by the 1H glass delay line 1', and then inputted to a suitable amplifier via an input terminal 12d of the integrated circuit, and further applied to respective other inputs of the second adder 3 and the subtracter 4, and inputted to a multiplier 5' via a 90° phase-shifter 24. As a result, a luminance signal is outputted from the second adder 3, and the chrominance signal is outputted from the subtracter 4.

Then, a phase difference signal according to error component of a delay amount by the 1H glass delay line 1' is outputted to a low-pass filter 22' from the multiplier 5' so as to be integrated by the low-pass filter 22'.

The vertical synchronization signal is supplied to the low-pass filter 22', and therefore, the low-pass filter 22' operates only for the vertical blanking period, and the low-pass filter 22' holds a value detected for the vertical blanking period during another period (in a video signal period).

Furthermore, gylators 26 and 28 are connected to the input and output ends of the 1H glass delay line 1' via input terminals 12d and 12e of the integrated circuit, and the gylators 26 and 28 function as termination inductors of the 1H glass delay line 1'. Then, inductance values of the gylator 26 and 28 are controlled by the control voltage from the low-pass filter 22'. Therefore, the gylators 26 and 28 are controlled by the detection signal which is obtained through a multiplication of the color sub-carrier signals superposed on the composite video signal during the vertical blanking period at an input and output ends of the 1H glass delay line 1'.

In addition, the multiplier 5', the 90° phase-shifter 24, the low-pass filter 22' and the gylators 26 and 28 utilized in this embodiment shown are also disclosed in detail in the previous U.S. Pat. No. 5,267,027, and therefore, detailed descriptions will be omitted here, and incorporated by quoting the U.S. Pat. No. 5,267,027.

In FIG. 6 embodiment, the carrier-multiplexed composite video signal from the 1H glass delay line 1' is advanced in phase by 90 degrees by the 90° phase-shifter 24 to be applied to the multiplier 5' which constitutes a phase-comparator, and the carrier-multiplexed composite video signal from the first adder 14 is applied to the multiplier 5' as it is. Therefore, the multiplier 5' applies an error signal according to a deviation amount of the phase difference from the 90 degrees of the phase difference of the both signals to the low-pass filter 22'. Therefore, the control voltage according to the deviation amount of the phase difference is outputted from the low-pass filter 22', and the control voltage is applied to the gylators 26 and 28. Accordingly, the gylators 26 and 28 can be automatically controlled such that the phase difference between the signals supplied to the inputs of the second adder 3 and the subtracter 4, respectively, becomes always 180 degrees.

Figure 7:
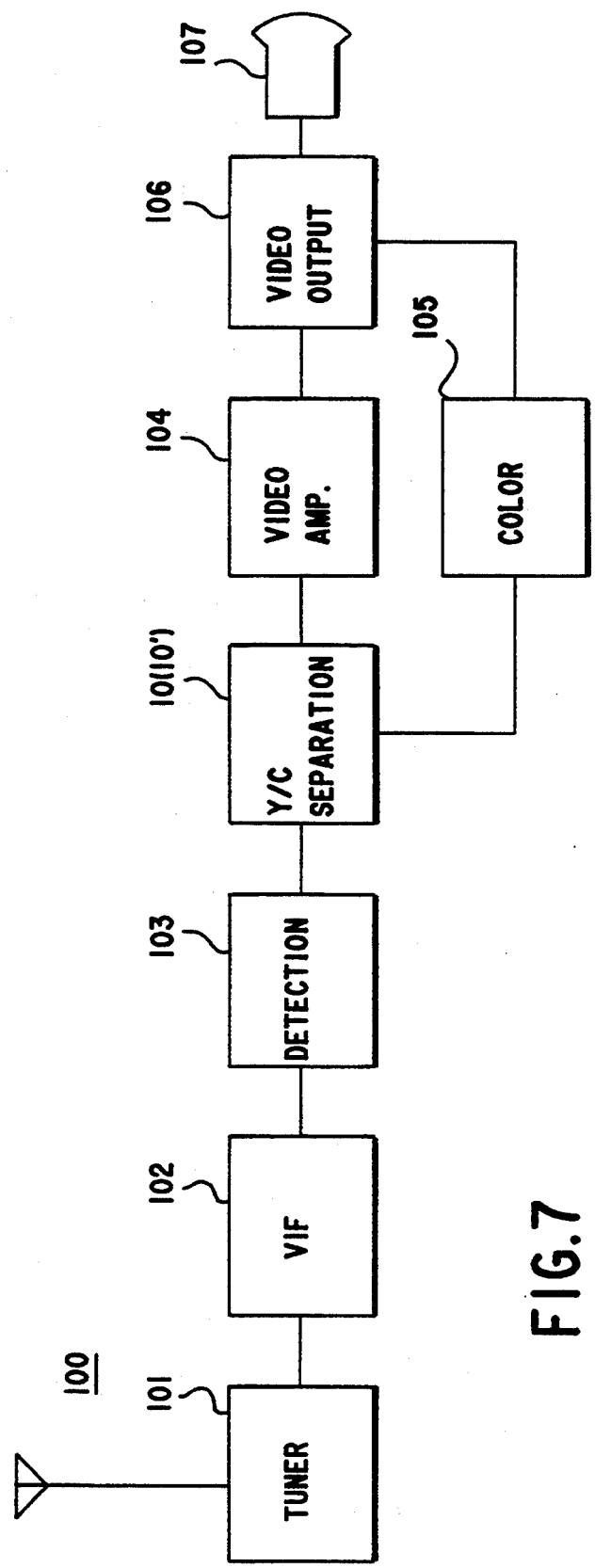
FIG. 7 is a block diagram showing a television receiver or a television signal processing circuit in which the Y/C separation circuit according to the present invention is utilized.

The Y/C separation circuit 10 or 10' shown in FIG. 5 or FIG. 6 is incorporated in a television signal processing apparatus such as a television receiver 100, a video tape recorder and etc. shown in FIG. 7. More specifically, the television receiver or the apparatus 100 includes a tuner 101 which receives an electromagnetic wave from antenna and outputs a video intermediate frequency signal, and the video intermediate frequency (VIF) signal from the tuner 101 is applied to a VIF circuit 102 to be amplified. The VIF signal from the VIF circuit 102 is detected by a detection circuit 103.

An output from the detection circuit 103 is inputted to a Y/C separation circuit 10 (10'). The Y/C separation circuit 10 (10') separates a luminance signal (Y signal) component and a color signal (C signal) component from a video signal detected. The luminance signal separated by the Y/C separation circuit 10 (10') is amplified by a video amplifier 104. The color signal separated by the Y/C separation circuit 10 (10') is inputted to the color circuit 105. Then, the color signal component from the color circuit 105 is applied to a video output circuit 106 together with the luminance signal component, and therefore, a television video image is displayed on a television monitor 107 by the video output circuit 106.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A Y/C separation circuit, comprising:
multiplexing means for receiving a composite video signal composed of a first signal including a color burst signal and a chrominance signal and a second signal including a luminance signal having a frequency-interleave relationship to the first signal, and a color sub-carrier signal which is in synchronization with said color burst signal, and for multiplexing said color sub-carrier signal on said composite video signal during a vertical blanking period to produce a carrier-multiplexed composite video signal;
a 1H delay line for receiving said carrier-multiplexed composite video signal; and
separating means for separating said chrominance signal and said luminance signal on the basis of signals at an input and an output of said 1H delay line.

2. A Y/C separation circuit according to claim 1, further comprising a gain-variable amplifier for adjusting an amplitude of the carrier-multiplexed composite video signal passed through said 1H delay line; multiplication means for multiplying a carrier signal component included in a separated luminance signal and a carrier signal component included in said carrier-multiplexed composite video signal; and a low-pass filter for receiving an output of said multiplication means and for withdrawing a control signal, wherein a gain of said gain-variable amplifier is controlled by the control signal from said low-pass filter.

3. A Y/C separation circuit according to claim 2, wherein said multiplication means multiplies the carrier signal component included in said carrier-multiplexed composite video signal which is outputted from said multiplexing means and the carrier signal component of said separated luminance signal.

4. A Y/C separation circuit according to claim 1, wherein said multiplication means multiplies the carrier signal component included in the carrier-multiplexed composite video signal which is passed through said 1H delay line and the carrier signal component of said separated luminance signal.

5. A Y/C separation circuit according to claim 1, wherein said 1H delay line includes a 1H glass delay line, further comprising:
gylator means for terminating at least one of an input end and an output end of said 1H glass delay line;

and controlling means for controlling an inductance value of said gylator means on the basis of signals at an input end and an output end of said 1H glass delay line.

6. A Y/C separation circuit according to any one of claims 1 to 5, wherein said multiplexing means includes adding means for receiving said composite video signal and said color sub-carrier signal; and means for enabling said adding means during said vertical blanking period.

7. A television receiver, comprising:

multiplexing means for receiving a composite video signal composed of a first signal including a color burst signal and a chrominance signal and a second signal including a luminance signal having a frequency-interleave relationship to the first signal, and a color sub-carrier signal which is in synchronization with said color burst signal, and for multiplexing said color sub-carrier signal on said composite video signal during a vertical blanking period to produce a carrier-multiplexed composite video signal;

a 1H delay line for receiving said carrier-multiplexed composite video signal; and separating means for separating said chrominance signal and said luminance signal on the basis of signals at an input and an output of said 1H delay line.

8. A television receiver according to claim 7, further comprising a gain-variable amplifier for adjusting an amplitude of the carrier-multiplexed composite video signal passed through said 1H delay line; multiplication means for multiplying a carrier signal component included in a separated luminance signal and a carrier signal component included in said carrier-multiplexed composite video signal; and a low-pass filter for receiving an output of said multiplication means and for withdrawing a control signal, wherein a gain of said gain-variable amplifier is controlled by the control signal from said low-pass filter.

9. A television receiver according to claim 7, wherein said 1H delay line includes a 1H glass delay line, further comprising:

gylator means for terminating at least one of an input end and an output end of said 1H glass delay line; and controlling means for controlling an inductance value of said gylator means on the basis of signals at an input end and an output end of said 1H glass delay line.

10. A television signal processing apparatus, comprising:

multiplexing means for receiving a composite video signal composed of a first signal including a color burst signal and a chrominance signal and a second signal including a luminance signal having a frequency interleave relationship to the first signal, and a color sub-carrier signal which is in synchronization with said color burst signal, and for multiplexing said color sub-carrier signal on said composite video signal during a vertical blanking period to produce a carrier-multiplexed composite video signal;

a 1H delay line for receiving said carrier-multiplexed composite video signal; and separating means for separating said chrominance signal and said luminance signal on the basis of signals at an input and an output of said 1H delay line.

11. A television signal processing apparatus according to claim 10, further comprising a gain-variable amplifier for adjusting an amplitude of the carrier-multiplexed composite video signal passed through said 1H delay line; multiplication means for multiplying a carrier signal component included in a separated luminance signal and a carrier signal component included in said carrier-multiplexed composite video signal; and a low-pass filter for receiving an output of said multiplication means and for withdrawing a control signal, wherein a gain of said gain-variable amplifier is controlled by the control signal from said low-pass filter.

12. A television signal processing apparatus according to claim 10, wherein said 1H delay line includes a 1H glass delay line, further comprising:

gylator means for terminating at least one of an input end and an output end of said 1H glass delay line; and controlling means for controlling an inductance value of said gylator means on the basis of signals at an input end and an output end of said 1H glass delay line.

* * * * *